US012663337B2

(12) United States Patent
Qiao et al.

(10) Patent No.: US 12,663,337 B2
(45) Date of Patent: Jun. 23, 2026

(54) LENS LOOSENING TEST DEVICE AND LENS LOOSENING TEST METHOD

(71) Applicant: AAC Optics (Suzhou) Co., Ltd., Suzhou (CN)

(72) Inventors: Nan Qiao, Suzhou (CN); Haopeng Zhou, Suzhou (CN); Dasong Ge, Suzhou (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 250 days.

(21) Appl. No.: 18/391,620

(22) Filed: Dec. 20, 2023

(65) Prior Publication Data

US 2024/0337557 A1 Oct. 10, 2024

Related U.S. Application Data

(63) Continuation of application No. PCT/CN2023/087407, filed on Apr. 10, 2023.

(51) Int. Cl.
*G01M 11/02* (2006.01)

(52) U.S. Cl.
CPC .... *G01M 11/0221* (2013.01); *G01M 11/0214* (2013.01)

(58) Field of Classification Search
CPC .......... G01M 11/0221; G01M 11/0214; H04N 17/002
See application file for complete search history.

(56) References Cited

U.S. PATENT DOCUMENTS

| | | | | |
|---|---|---|---|---|
| 5,966,209 A | * | 10/1999 | Cheng | G01M 11/0264 356/124.5 |
| 2007/0147764 A1 | * | 6/2007 | Chang | G01M 11/0292 385/135 |
| 2013/0278924 A1 | * | 10/2013 | Peng | G01M 11/0214 356/124 |
| 2014/0320851 A1 | * | 10/2014 | Chu | G01M 11/0214 356/125 |
| 2023/0087045 A1 | * | 3/2023 | Chang | G06F 1/187 361/679.58 |

OTHER PUBLICATIONS

Hu et al "Module Testing Device And Module Testing Method Using The Same", Oct. 25, 2019, CN110381193A (Year: 2019).*
Chen et al "A Correcting Device For AF Camera Module, A Distance Testing System And Method Thereof", Nov. 20, 2018, CN 105807552B (Year: 2018).*

* cited by examiner

*Primary Examiner* — Sang H Nguyen
(74) *Attorney, Agent, or Firm* — Wiersch Law Group

(57) ABSTRACT

The lens loosening test device includes a frame, a testing module, and a testing picture card. The testing module includes a base, a rotating drive component, a rotating bracket connected to and driven by the rotating drive component, a knocking component fixed to the rotating bracket, an imaging component, and a fixing component. The fixing component is configured to fix the lens to be tested to enable the lens to be tested to be arranged at top of the imaging component, the knocking component is configured to knock the lens to be tested, and the imaging component is configured to capture an image of the testing picture card by the lens to be tested and determine whether the lens to be tested is loose or not based on the image. The present application can accurately detect whether the lens is loose or not.

15 Claims, 3 Drawing Sheets

100

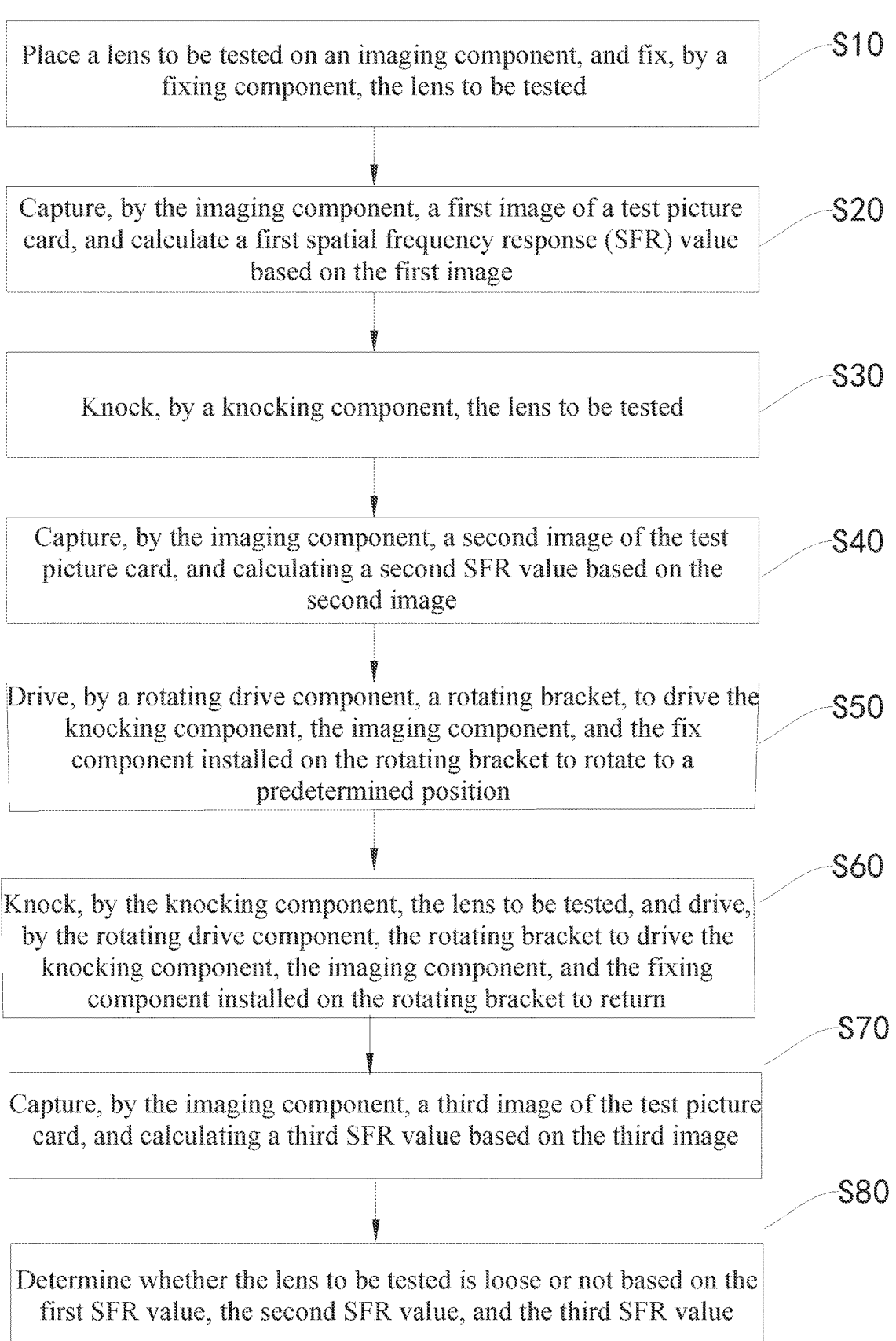

Place a lens to be tested on an imaging component, and fix, by a fixing component, the lens to be tested — S10

Capture, by the imaging component, a first image of a test picture card, and calculate a first spatial frequency response (SFR) value based on the first image — S20

Knock, by a knocking component, the lens to be tested — S30

Capture, by the imaging component, a second image of the test picture card, and calculating a second SFR value based on the second image — S40

Drive, by a rotating drive component, a rotating bracket, to drive the knocking component, the imaging component, and the fix component installed on the rotating bracket to rotate to a predetermined position — S50

Knock, by the knocking component, the lens to be tested, and drive, by the rotating drive component, the rotating bracket to drive the knocking component, the imaging component, and the fixing component installed on the rotating bracket to return — S60

Capture, by the imaging component, a third image of the test picture card, and calculating a third SFR value based on the third image — S70

Determine whether the lens to be tested is loose or not based on the first SFR value, the second SFR value, and the third SFR value — S80

FIG. 4

LENS LOOSENING TEST DEVICE AND LENS LOOSENING TEST METHOD

CROSS REFERENCE TO RELATED APPLICATIONS

The present disclosure is a continuation of PCT Patent Application No. PCT/CN2023/087407, entitled "LENS LOOSENING TEST DEVICE AND LENS LOOSENING TEST METHOD," filed Apr. 10, 2023, which is incorporated by reference herein in its entirety.

TECHNICAL FIELD

The embodiments of the present application relate to the technical field of lens loosening tests, in particular to a lens loosening test device and a lens loosening test method.

BACKGROUND

As one of the important components of automobiles, on-board lens has been continuously upgraded with the development of intelligent vehicles in recent years. In an auto drive system, a lens is the hardware foundation to realize environment recognition and obstacle warning, and the lens is applied to, or the lens serves as a solution more than 80% of the autopilot technology. Due to the special working environment and state of automobiles, the on-board lens needs to have more stable performance to avoid poor imaging performance under long-term vibration environments. Therefore, the on-board lens generally needs to undergo loosening testes before leaving the factory to detect the loosening characteristics of the lens.

In related technologies, there are two main loosening testing solutions for the on-board lens.

One solution is to listen to the sound by human ears after knocking the lens. There may be differences in the sound between a loose lens and a normal lens after knocking, but these differences are often relatively small and require experienced testers to distinguish. Therefore, this solution has high requirements for testers, and the test efficiency is also low, which makes it difficult to ensure the accuracy of test.

Another solution is to detect the imaging performance of the lens after knocking. In response to the imaging performance deteriorating, it indicates that the lens is loose. This solution can achieve automation and does not require manual operation, but the detection rate is actually very low in actual test. Some loose lenses do not cause changes in optical imaging under short-term knocking, and require a considerable period of vibration excitation to possibly cause changes in imaging performance. Therefore, the test effect of this solution is difficult to meet production requirements.

Therefore, it is necessary to provide a lens loosening test device and a lens loosening test method to improve the efficiency and accuracy in loosening test of lens.

SUMMARY

The objective of the present application is to provide a lens loosening test device and a lens loosening test method to improve the efficiency and accuracy in loosening test of lens.

The technical solutions of the present application are as follows. A lens loosening test device for detecting whether the lens to be tested is loose, and the lens loosening test device includes a frame, a testing module fixed on the frame, and a testing picture card fixed on the frame and adjacent to the testing module;

the testing module includes a base fixed to the frame, a rotating drive component fixed to the base, a rotating bracket connected to and driven by the rotating drive component to rotate, a knocking component fixed to the rotating bracket, an imaging component fixed to the rotating bracket, and a fixing component fixed to the rotating bracket, where the knocking component and the fixing component are arranged adjacent to the imaging component, the fixing component is configured to fix the lens to be tested to enable the lens to be tested to be arranged at top of the imaging component, the knocking component is configured to knock the lens to be tested, and the imaging component is configured to capture an image of the testing picture card by the lens to be tested and determine whether the lens to be tested is loose or not based on the image.

As an improvement, the knocking component includes a first fixing frame fixed on the rotating bracket, a knocking cylinder fixed on the first fixing frame, and a knocking portion connected to the knocking cylinder and driven by the knocking cylinder. The knocking cylinder is configured to drive the knocking portion to knock the lens to be tested.

As an improvement, the fixing component includes a second fixing frame fixed on the rotating bracket, a clamping cylinder fixed on the second fixing frame, and a clamping portion connected to the clamping cylinder and driven by the clamping cylinder. The clamping cylinder is configured to drive the clamping portion to clamp the lens to be tested.

As an improvement, the imaging component includes an adjusting component fixed to the rotating bracket and a sensor component fixed on top of the adjusting component. The adjusting component is configured to adjust a position of the sensor component.

As an improvement, the adjusting component includes a horizontal adjusting component fixed on the rotating bracket and a vertical adjusting component fixed on the horizontal adjusting component. The sensor component is fixed on top of the vertical adjusting component, and the vertical adjusting component is configured to adjust the position of the sensor component along a vertical direction, and the horizontal adjusting component is configured to adjust a position of the vertical adjusting component to adjust the position of the sensor component along a horizontal direction.

As an improvement, there are multiple testing picture cards, and the imaging component is configured to capture images of the multiple testing picture cards by the lens to be tested.

As an improvement, there are 5 testing picture cards, in which 4 testing picture cards are arranged on four sides of the testing module, respectively, and 1 testing picture card is arranged directly above the testing module.

A lens loosening test method is further provided according to the present application, a lens to be tested is tested by a lens loosening test device according to any one above, and the lens loosening test method includes:

placing the lens to be tested on an imaging component, and fixing, by a fixing component, the lens to be tested;

capturing, by the imaging component, a first image of a testing picture card, and calculating a first spatial frequency response (SFR) value based on the first image;

knocking, by a knocking component, the lens to be tested;

capturing, by the imaging component, a second image of the testing picture card, and calculating a second SFR value based on the second image;

driving, by a rotating drive component, a rotating bracket, the knocking component, the imaging component, and the fixing component installed on the rotating bracket to rotate to a predetermined position;

knocking, by the knocking component, the lens to be tested, and driving, by the rotating drive component, the rotating bracket, the knocking component, the imaging component, and the fixing component installed on the rotating bracket to return;

capturing, by the imaging component, a third image of the testing picture card, and calculating a third SFR value based on the third image; and determining whether the lens to be tested is loose or not based on the first SFR value, the second SFR value, and the third SFR value.

As an improvement, determining whether the lens to be tested is loose or not based on the first SFR value, the second SFR value, and the third SFR value includes:

calculating a first difference between the first SFR value and the second SFR value;

calculating a second difference between the first SFR value and the third SFR value;

determining whether the first difference and the second difference are both less than a preset threshold; and in response to the first difference and the second difference not being both less than the preset threshold, determining that the lens to be tested is loose.

As an improvement, driving, by the rotating drive component, the rotating bracket, the knocking component, the imaging component, and the fixing component installed on the rotating bracket to rotate to the predetermined position includes:

driving, by the rotating drive component, the rotating bracket, the knocking component, the imaging component, and the fixing component installed on the rotating bracket to rotate 180 degrees to the predetermined position, at which the rotating bracket is horizontally downward.

The advantageous effect of the present application is that the lens loosening test device of the present application fixes a lens to be tested on top of the imaging component by a fixing component, and uses the knocking component to knock the lens to be tested. The imaging component is configured to capture images of the testing picture card before and after knocking the lens to be tested, and compares the images of the testing picture card before and after knocking the lens to be tested to determine whether the lens to be tested is loose or not. The lens loosening test device of the present application can effectively detect whether the lens to be tested is loose or not with high efficiency and accuracy.

BRIEF DESCRIPTION OF THE DRAWINGS

FIG. 4 is a flowchart of a lens loosening test method provided according to the present application.

DETAILED DESCRIPTION

The present application will be further explained in conjunction with the accompanying drawings and embodiments.

Figure 1:
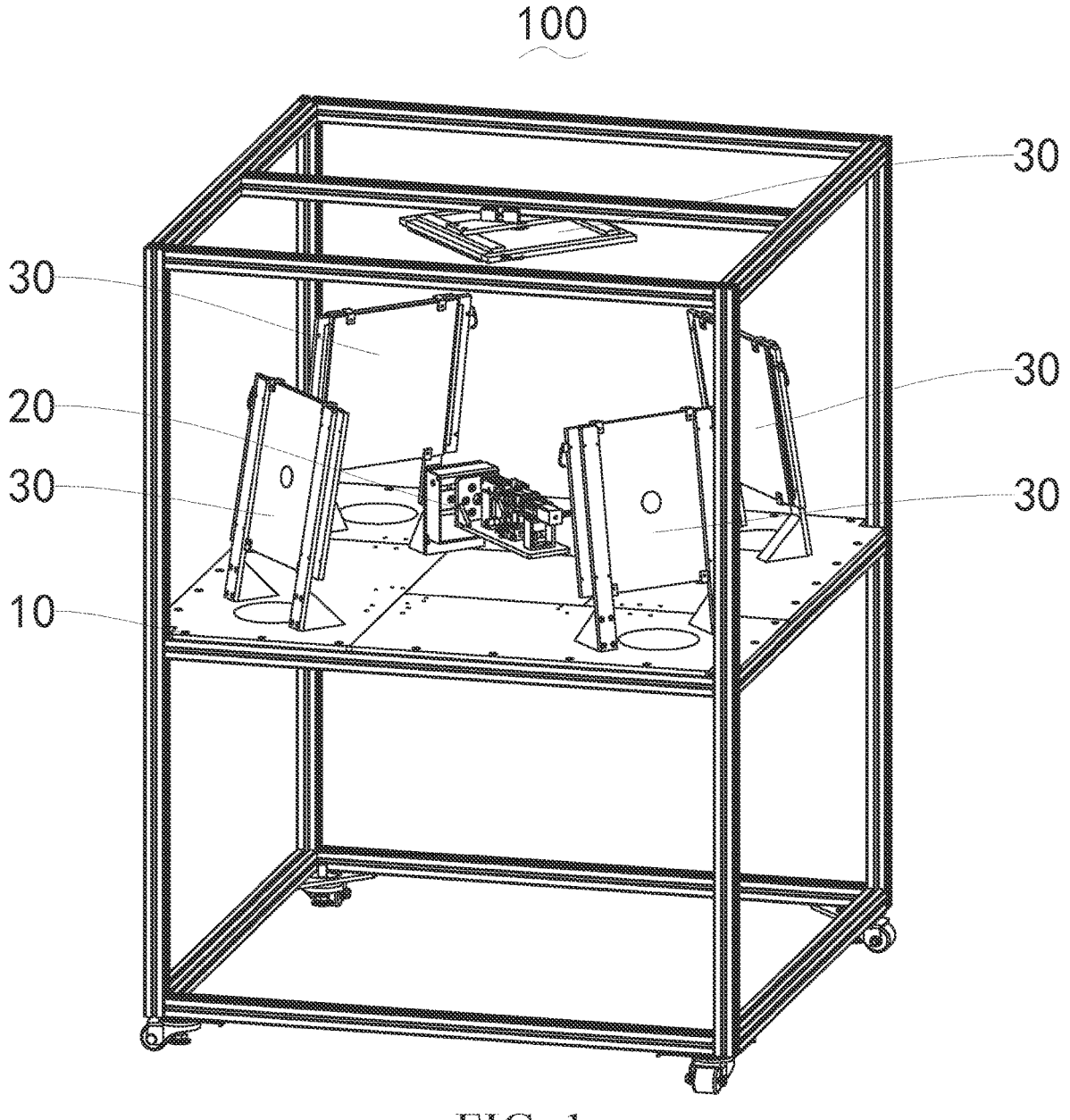
FIG. 1 is a schematic structural view of a lens loosening test device provided according to the present application.
Figure 2:
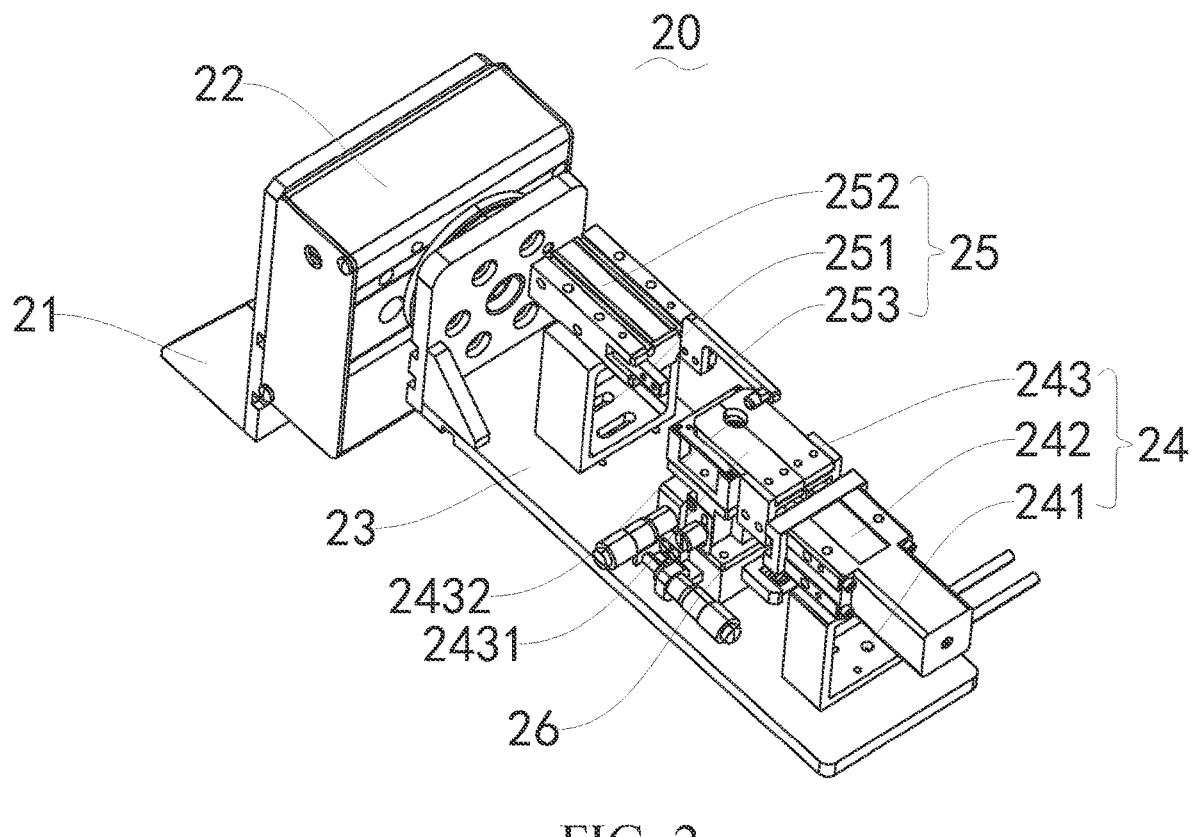
FIG. 2 is a schematic structural view of a testing module of a lens loosening test device provided according to the present application.

As shown in FIG. 1 to FIG. 2, FIG. 1 is a schematic structural view of a lens loosening test device 100 provided according to the present application.

FIG. 2 is a schematic structural view of a testing module 20 of the lens loosening test device 100 provided according to the present application. The lens loosening test device 100 of the present application is configured to detect whether the lens to be tested is loose or not, specifically to detect whether the components inside the lens to be tested are loose or not. In this embodiment, the lens to be tested is an on-board lens, and in other embodiments, other lenses may also be tested without limitation.

The lens loosening test device 100 includes a frame 10, a testing module 20 fixed to the frame 10, and a testing picture card 30 fixed to the frame 10 and adjacent to the testing module 20. The frame 10 is configured to provide installation position for the testing module 20 and the testing picture card 30.

The testing module 20 includes a base 21 arranged on the frame 10, a rotating drive component 22 fixed on the base 21, a rotating bracket 23 connected to and driven by the rotating drive component 22 to rotate, a knocking component 25 fixed on the rotating bracket 23, an imaging component 26 fixed on the rotating bracket 23, and a fixing component 24 fixed on the rotating bracket 23. The knocking component 25 and the fixing component 24 are arranged adjacent to the imaging component 26. Specifically, the knocking component 25 and the fixing component 24 are arranged on a left side and a right side of the imaging component 26, respectively. The knocking component 25 and the fixing component 24 may also be arranged on other sides of the imaging component 26. In response to the rotating drive component 22 being in an initial position, the rotating bracket 23 is horizontally upward, and the knocking component 25, the imaging component 26, and the fixing component 24 are all arranged on a horizontal upper side of the rotating bracket 23.

The lens loosening test device 100 of the present application fixes a lens to be tested on top of the imaging component 26 by a fixing component 24, and uses the knocking component 25 to knock the lens to be tested. The imaging component 26 is configured to capture images of the testing picture card 30 before and after knocking the lens to be tested, and compares the images of the testing picture card 30 before and after knocking the lens to be tested to determine whether the lens to be tested is loose or not. The lens loosening test device 100 of the present application can effectively detect whether the lens to be tested is loose or not with high efficiency and accuracy.

The fixing component 24 is configured to fix the lens to be tested to enable the lens to be tested to be arranged on top of the imaging component 26. The fixing component 24 includes a second fixing frame 241 fixed on the rotating bracket 23, a clamping cylinder 242 fixed on the second fixing frame 241, and a clamping portion 243 connected to the clamping cylinder 242 and driven by the clamping cylinder 242. The clamping cylinder 242 is configured to drive the clamping portion 243 to clamp the lens to be tested. Specifically, the clamping portion 243 is composed of two symmetrically arranged clamping blocks 2431, a semicircular notch 2432 is formed on two opposite sides of each of the two clamping blocks 2431. The clamping cylinder 242 is configured to drive the two clamping blocks 2431 to approach each other or move away from each other. In response to the clamping cylinder 242 driving the two clamping blocks 2431 to approach each other, two semicircular notches 2432 arranged opposite to each other form a circle, and the lens to be tested is fixed by two clamping blocks 2431. In response to the clamping cylinder 242 driving the two clamping blocks 2431 to move away from each other, the lens to be tested is released by the two clamping blocks 2431. The rotating drive component 22 is a rotating motor, and in other embodiments, the rotating drive component 22 may also be a rotating cylinder. The clamping cylinder 242 is a parallel-open-close clamping claw cylinder, and in other embodiments, an electric cylinder clamping claw may also be used.

The knocking component 25 is used to tap the lens to be tested. The percussion component 25 includes a first fixing frame 251 fixed on the rotating bracket 23, a percussion cylinder 252 fixed on the first fixing frame 251, and a percussion part 253 connected to and driven by the percussion cylinder 252. The percussion cylinder 252 is used to drive the percussion part 253 to strike the lens to be tested. When the lens to be tested is fixed by the clamping portion 243, the height of the lens to be tested is the same as the height of the knocking portion 253. The percussion cylinder 252 can drive the percussion part 253 to oscillate back and forth to strike the lens to be tested. The knocking cylinder 252 is a fulcrum open close type cylinder, and in other embodiments, the electric cylinder scheme can also be used.

The imaging component 26 is configured to capture an image of the testing picture card 30 by the lens to be tested and determine whether the lens to be tested is loose or not based on the image. Specifically, the imaging component 26 is configured to capture images of the testing picture card 30 before and after knocking the lens to be tested, and compare the images of the testing picture card 30 captured before and after knocking the lens to be tested to determine whether the lens to be tested is loose or not.

Figure 3:
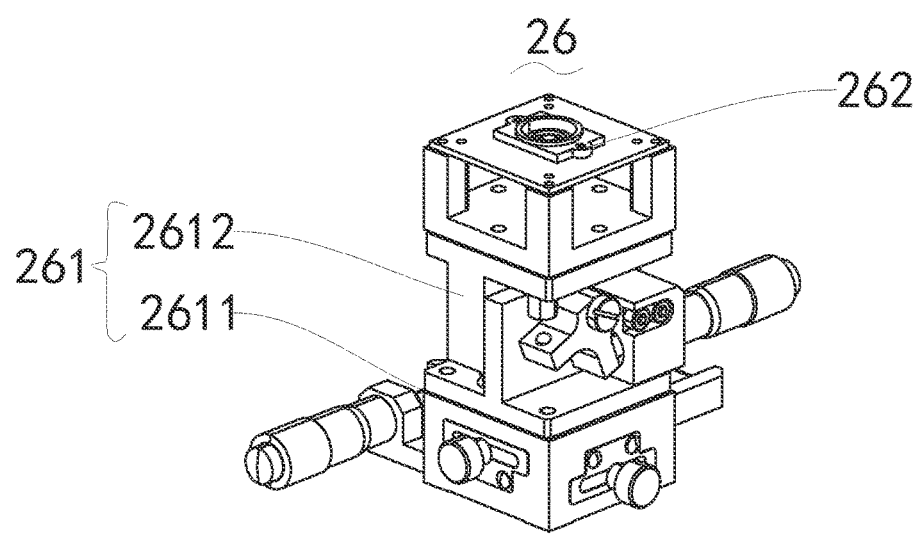
FIG. 3 is a schematic structural view of an imaging component of a lens loosening test device provided according to the present application.

As shown in FIG. 3, which is a schematic structural view of the imaging component 26 of the lens loosening test device 100 provided according to the present application. The imaging component 26 includes an adjusting component 261 fixed on the rotating bracket 23 and a sensor component 262 fixed on top of the adjusting component 261. The adjusting component 261 is configured to adjust a position of the sensor component 262. Specifically, the adjusting component 261 includes a horizontal adjusting component 2611 fixed on the rotating bracket 23 and a vertical adjusting component 2612 fixed on top of the vertical adjusting component 2612. The vertical adjusting component 2612 is configured to adjust the position of the sensor component 262 along a vertical direction, and the horizontal adjusting component 2611 is configured to adjust a position of the vertical adjusting component 2612 to adjust the position of the sensor component 262 along a horizontal direction. With the above structure, the position of the sensor component 262 can be flexibly adjusted in three directions, thereby ensuring that the sensor component 262 can be aligned with the lens to be tested.

Furthermore, the lens loosening test device 100 includes multiple testing picture cards 30, and the imaging component 26 is configured to capture the images of the multiple testing picture cards 30 by the lens to be tested. That is, in one of the images, there are images corresponding to all the testing picture cards 30. In this embodiment, the lens loosening test device 100 includes 5 testing picture cards 30, in which 4 testing picture cards 30 are arranged on four sides of the testing module 20, respectively, and 1 testing picture card 30 is arranged directly above the testing module 20.

A lens loosening test method is further provided according to the present application, and the lens loosening test method is used to test the lens to be tested by the lens loosening test device 100, as shown in FIG. 4, which is a flowchart of the lens loosening test method provided according to the present application. The method includes the following operations S10 to S80.

In operation S10, the lens to be tested is placed on an imaging component 26, and the lens to be tested is fixed by a fixing component 24.

Specifically, at this point, the lens loosening test device 100 is in an initial position, the rotating bracket 23 is horizontally upward, and the knocking component 25, the imaging component 26, and the fixing component 24 are also horizontally upward. Firstly, the lens to be tested is placed on the imaging component 26, and the clamping cylinder 242 drives the two clamping blocks 2431 to approach each other. The two semicircular notches 2432 form a circle, and the lens to be tested is fixed by the two clamping blocks 2431.

In operation S20, a first image of a testing picture card 30 is captured by the imaging component 26, and a first spatial frequency response (SFR) value is calculated based on the first image.

Specifically, a first image of the testing picture card 30 is captured by the imaging component 26. The first image includes images of all testing picture cards 30. It is necessary to calculate a SFR value of each of the images of each testing picture card 30. The first SFR value is used as the SFR value before knocking the lens to be tested. In this embodiment, the 5 testing picture cards 30 have corresponding first SFR values.

Specifically, the SFR value is calculated as follows.

The images of each testing picture card 30 is oversampled to obtain a straight line in which black and white appears alternatively. The line is derived to obtain a rate of variation. Fast Fourier transform (FFT) is performed on the rate of variation to obtain a SFR value of the straight line.

In operation S30, the lens to be tested is knocked by a knocking component 25.

Specifically, the knocking cylinder 252 drives the knocking portion 253 to knock the lens to be tested. The number of knockings may be set according to the actual situation, such as 3, 5, 10, etc.

In operation S40, a second image of the testing picture card 30 is captured by the imaging component 26, and a second SFR value is calculated based on the second image.

Specifically, a second image of the testing picture card 30 is captured by the imaging component 26, and the second image includes the images of all testing picture cards 30. It is necessary to calculate a SFR value of the images of each testing picture card 30. The second SFR value is used as the SFR value after the lens to be tested is knocked first time.

In operation S50, a rotating bracket 23 is driven by a rotating drive component 22, the knocking component 25, the imaging component 26, and the fixing component 24 installed on the rotating bracket 23 are driven by the rotating drive component 22 to rotate to a predetermined position.

Specifically, the rotating drive component 22 is configured to drive the rotating bracket 23 to rotate 180 degrees. In addition, the rotating bracket 23 is horizontally downward. The knocking component 25, the imaging component 26, and the fixing component 24 are also horizontally downward.

In operation S60, the lens to be tested is knocked by the knocking component 25, the rotating bracket 23 is driven by the rotating drive component 22 to rotate, the knocking component 25, the imaging component 26, and the fixing component 24 installed on the rotating bracket 23 are driven by the rotating drive component 22 to return.

Specifically, the knocking cylinder 252 drives the knocking portion 253 to knock the lens to be tested. The number of knockings may be set according to the actual situation, such as 3, 5, 10, etc. Then, the rotating bracket 23, the knocking component 25, imaging component 26, and fixing component 24 installed on the rotating bracket 23 are driven by the rotating drive component 22 to rotate and return to a horizontal upward state.

In operation S70, a third image of the testing picture card 30 is captured by the imaging component 26, and a third SFR value is calculated based on the third image.

Specifically, the third image of the testing picture card 30 is captured by the imaging component 26, and the third image includes images of all testing picture cards 30. It is necessary to calculate the SFR value of images of each testing picture card 30. The third SFR value is used as a SFR value after the lens to be tested is knocked twice.

In operation S80, whether the lens to be tested is loose or not is determined based on the first SFR value, the second SFR value, and the third SFR value.

Specifically, the operation S80 specifically includes the following sub operations S801 to S804.

In sub operation S801, a first difference between the first SFR value and the second SFR value is calculated.

Specifically, the first difference is calculated as follows: $DSFR1=SFR_{before\ knocking}-SFR_{after\ first\ knocking}$. Among them, the DSFR1 is the first difference, the $SFR_{before\ knocking}$ is the first SFR value, and the $SFR_{after\ first\ knocking}$ IS the second SFR value.

In sub operation S802, a second difference between the first SFR value and the third SFR value is calculated.

Specifically, the second difference is calculated as follows: $DSFR2=SFR_{before\ knocking}-SFR_{after\ second\ knocking}$. Among them, the DSFR2 is the second difference, the $SFR_{before\ knocking}$ is the first SFR value, and the $SFR_{after\ second\ knocking}$ is the third SFR value.

In sub operation S803, whether the first difference and the second difference are both less than a preset threshold is determined.

Specifically, a preset threshold is preset, where the preset threshold can be set according to the actual situation. For example, a batch of lenses that are not loose can be tested separately, and corresponding first SFR value, second SFR value, and third SFR value can be obtained by operations S10 to S70. The corresponding first difference and second difference can be calculated by sub operations S801 to S802. Another batch of loosen lenses are tested to obtain corresponding first SFR value, the second SFR value, and the third SFR value by operations S10 to S70, the corresponding first difference and the second difference are calculated by sub operations S801 to S802. The preset threshold is determined by comparing a difference between the first difference and the second difference corresponding to the lens that are not loose and the loosen lens, so that the first difference and the second difference corresponding to the loosen lens are both greater than the preset threshold, while the first difference and the second difference of the lens that is not loose are both less than the preset threshold.

In sub operation S804, in response to the first difference and the second difference not being both less than the preset threshold, the lens to be tested is determined to be loose.

Specifically, in response to the first difference and the second difference being both less than the preset threshold, the lens to be tested is determined to be not loose. In response to the first difference and the second difference not being both less than the preset threshold, the lens to be tested is determined to be loose.

By using the above method, it is possible to effectively detect whether the lens is loose with high test efficiency and accuracy.

The above are only the embodiments of the present application. It should be pointed out that for those of ordinary skill in the art, improvements may be made without departing from the inventive concept of the present application, and the improvements shall fall with the scope of protection of the present application.

What is claimed is:

1. A lens loosening test device configured to detect whether a lens to be tested is loose or not, comprising a frame, a testing mechanism fixed on the frame, and a testing picture card fixed on the frame and adjacent to the testing mechanism, wherein:

the testing mechanism includes a base fixed to the frame, a rotating drive component fixed to the base, a rotating bracket connected to and driven by the rotating drive component to rotate, a knocking component fixed to the rotating bracket, an imaging component fixed to the rotating bracket, and a fixing component fixed to the rotating bracket, wherein the knocking component and the fixing component are arranged adjacent to the imaging component, the fixing component is configured to fix the lens to be tested to enable the lens to be tested to be arranged at top of the imaging component, the knocking component is configured to knock the lens to be tested, and the imaging component is configured to capture an image of the testing picture card by the lens to be tested and determine whether the lens to be tested is loose or not based on the image;

wherein the knocking component comprises a first fixing frame fixed on the rotating bracket, a knocking cylinder fixed on the first fixing frame, and a knocking portion connected to the knocking cylinder and driven by the knocking cylinder, wherein the knocking cylinder is configured to drive the knocking portion to knock the lens to be tested.

2. The lens loosening test device according to claim 1, wherein the fixing component comprises a second fixing frame fixed on the rotating bracket, a clamping cylinder fixed on the second fixing frame, and a clamping portion connected to the clamping cylinder and driven by the clamping cylinder, wherein the clamping cylinder is configured to drive the clamping portion to clamp the lens to be tested.

3. A lens loosening test method, wherein a lens to be tested is tested by a lens loosening test device according to claim 2, and the lens loosening test method comprises:

placing the lens to be tested on an imaging component, and fixing, by a fixing component, the lens to be tested;

capturing, by the imaging component, a first image of a testing picture card, and calculating a first spatial frequency response (SFR) value based on the first image;

9 knocking, by a knocking component, the lens to be tested;

capturing, by the imaging component, a second image of the testing picture card, and calculating a second SFR value based on the second image;

driving, by a rotating drive component, a rotating bracket, the knocking component, the imaging component, and the fixing component installed on the rotating bracket to rotate to a predetermined position;

knocking, by the knocking component, the lens to be tested, and driving, by the rotating drive component, the rotating bracket, the knocking component, the imaging component, and the fixing component installed on the rotating bracket to return;

capturing, by the imaging component, a third image of the testing picture card, and calculating a third SFR value based on the third image; and determining whether the lens to be tested is loose or not based on the first SFR value, the second SFR value, and the third SFR value.

4. The lens loosening test device according to claim 1, wherein the imaging component comprises an adjusting component fixed to the rotating bracket and a sensor component fixed on top of the adjusting component, wherein the adjusting component is configured to adjust a position of the sensor component.

5. The lens loosening test device according to claim 4, wherein the adjusting component comprises a horizontal adjusting component fixed on the rotating bracket and a vertical adjusting component fixed on the horizontal adjusting component, wherein the sensor component is fixed on top of the vertical adjusting component, and the vertical adjusting component is configured to adjust the position of the sensor component along a vertical direction, and the horizontal adjusting component is configured to adjust a position of the vertical adjusting component to adjust the position of the sensor component along a horizontal direction.

6. A lens loosening test method, wherein a lens to be tested is tested by a lens loosening test device according to claim 5, and the lens loosening test method comprises:

placing the lens to be tested on an imaging component, and fixing, by a fixing component, the lens to be tested;

capturing, by the imaging component, a first image of a testing picture card, and calculating a first spatial frequency response (SFR) value based on the first image;

knocking, by a knocking component, the lens to be tested;

capturing, by the imaging component, a second image of the testing picture card, and calculating a second SFR value based on the second image;

driving, by a rotating drive component, a rotating bracket, the knocking component, the imaging component, and the fixing component installed on the rotating bracket to rotate to a predetermined position;

knocking, by the knocking component, the lens to be tested, and driving, by the rotating drive component, the rotating bracket, the knocking component, the imaging component, and the fixing component installed on the rotating bracket to return;

capturing, by the imaging component, a third image of the testing picture card, and calculating a third SFR value based on the third image; and determining whether the lens to be tested is loose or not based on the first SFR value, the second SFR value, and the third SFR value.

10

7. A lens loosening test method, wherein a lens to be tested is tested by a lens loosening test device according to claim 4, and the lens loosening test method comprises:

placing the lens to be tested on an imaging component, and fixing, by a fixing component, the lens to be tested;

capturing, by the imaging component, a first image of a testing picture card, and calculating a first spatial frequency response (SFR) value based on the first image;

knocking, by a knocking component, the lens to be tested;

capturing, by the imaging component, a second image of the testing picture card, and calculating a second SFR value based on the second image;

driving, by a rotating drive component, a rotating bracket, the knocking component, the imaging component, and the fixing component installed on the rotating bracket to rotate to a predetermined position;

knocking, by the knocking component, the lens to be tested, and driving, by the rotating drive component, the rotating bracket, the knocking component, the imaging component, and the fixing component installed on the rotating bracket to return;

capturing, by the imaging component, a third image of the testing picture card, and calculating a third SFR value based on the third image; and determining whether the lens to be tested is loose or not based on the first SFR value, the second SFR value, and the third SFR value.

8. The lens loosening test device according to claim 1, wherein there are a plurality of testing picture cards, and the imaging component is configured to capture images of the plurality of testing picture cards by the lens to be tested.

9. A lens loosening test method, wherein a lens to be tested is tested by a lens loosening test device according to claim 8, and the lens loosening test method comprises:

placing the lens to be tested on an imaging component, and fixing, by a fixing component, the lens to be tested;

capturing, by the imaging component, a first image of a testing picture card, and calculating a first spatial frequency response (SFR) value based on the first image;

knocking, by a knocking component, the lens to be tested;

capturing, by the imaging component, a second image of the testing picture card, and calculating a second SFR value based on the second image;

driving, by a rotating drive component, a rotating bracket, the knocking component, the imaging component, and the fixing component installed on the rotating bracket to rotate to a predetermined position;

knocking, by the knocking component, the lens to be tested, and driving, by the rotating drive component, the rotating bracket, the knocking component, the imaging component, and the fixing component installed on the rotating bracket to return;

capturing, by the imaging component, a third image of the testing picture card, and calculating a third SFR value based on the third image; and determining whether the lens to be tested is loose or not based on the first SFR value, the second SFR value, and the third SFR value.

10. The lens loosening test device according to claim 1, wherein there are 5 testing picture cards, in which 4 testing picture cards are arranged on four sides of the testing mechanism, respectively, and 1 testing picture card is arranged directly above the testing mechanism.

11. A lens loosening test method, wherein a lens to be tested is tested by a lens loosening test device according to claim 10, and the lens loosening test method comprises:

placing the lens to be tested on an imaging component, and fixing, by a fixing component, the lens to be tested;

capturing, by the imaging component, a first image of a testing picture card, and calculating a first spatial frequency response (SFR) value based on the first image;

knocking, by a knocking component, the lens to be tested;

capturing, by the imaging component, a second image of the testing picture card, and calculating a second SFR value based on the second image;

driving, by a rotating drive component, a rotating bracket, the knocking component, the imaging component, and the fixing component installed on the rotating bracket to rotate to a predetermined position;

knocking, by the knocking component, the lens to be tested, and driving, by the rotating drive component, the rotating bracket, the knocking component, the imaging component, and the fixing component installed on the rotating bracket to return;

capturing, by the imaging component, a third image of the testing picture card, and calculating a third SFR value based on the third image; and determining whether the lens to be tested is loose or not based on the first SFR value, the second SFR value, and the third SFR value.

12. A lens loosening test method, wherein a lens to be tested is tested by a lens loosening test device according to claim 1, and the lens loosening test method comprises:

placing the lens to be tested on an imaging component, and fixing, by a fixing component, the lens to be tested;

capturing, by the imaging component, a first image of a testing picture card, and calculating a first spatial frequency response (SFR) value based on the first image;

knocking, by a knocking component, the lens to be tested;

capturing, by the imaging component, a second image of the testing picture card, and calculating a second SFR value based on the second image;

driving, by a rotating drive component, a rotating bracket, to drive the knocking component, the imaging component, and the fixing component installed on the rotating bracket to rotate to a predetermined position;

knocking, by the knocking component, the lens to be tested, and driving, by the rotating drive component, the rotating bracket, the knocking component, the imaging component, and the fixing component installed on the rotating bracket to return;

capturing, by the imaging component, a third image of the testing picture card, and calculating a third SFR value based on the third image; and determining whether the lens to be tested is loose or not based on the first SFR value, the second SFR value, and the third SFR value.

13. The lens loosening test method according to claim 12, wherein determining whether the lens to be tested is loose or not based on the first SFR value, the second SFR value, and the third SFR value comprises:

calculating a first difference between the first SFR value and the second SFR value;

calculating a second difference between the first SFR value and the third SFR value;

determining whether the first difference and the second difference are both less than a preset threshold; and in response to the first difference and the second difference not being both less than the preset threshold, determining that the lens to be tested is loose.

14. The lens loosening test method according to claim 12, wherein driving, by the rotating drive component, the rotating bracket, the knocking component, the imaging component, and the fixing component installed on the rotating bracket to rotate to the predetermined position comprises:

driving, by the rotating drive component, the rotating bracket, the knocking component, the imaging component, and the fixing component installed on the rotating bracket to rotate 180 degrees to the predetermined position, at which the rotating bracket is horizontally downward.

15. A lens loosening test method, wherein a lens to be tested is tested by a lens loosening test device according to claim 1, and the lens loosening test method comprises: placing the lens to be tested on an imaging component, and fixing, by a fixing component, the lens to be tested; capturing, by the imaging component, a first image of a testing picture card, and calculating a first spatial frequency response (SFR) value based on the first image; knocking, by a knocking component, the lens to be tested; capturing, by the imaging component, a second image of the testing picture card, and calculating a second SFR value based on the second image; driving, by a rotating drive component, a rotating bracket, the knocking component, the imaging component, and the fixing component installed on the rotating bracket to rotate to a predetermined position; knocking, by the knocking component, the lens to be tested, and driving, by the rotating drive component, the rotating bracket, the knocking component, the imaging component, and the fixing component installed on the rotating bracket to return; capturing, by the imaging component, a third image of the testing picture card, and calculating a third SFR value based on the third image; and determining whether the lens to be tested is loose or not based on the first SFR value, the second SFR value, and the third SFR value.

\* \* \* \* \*